United States Patent [19]

Benett et al.

[11] Patent Number: 4,538,277
[45] Date of Patent: Aug. 27, 1985

[54] INDUCTIVE GAS LINE FOR PULSED LASERS

[75] Inventors: William J. Benett, Livermore; Terry W. Alger, Tracy, both of Calif.

[73] Assignee: The United States of America as represented by the United States Department of Energy, Washington, D.C.

[21] Appl. No.: 426,435

[22] Filed: Sep. 29, 1982

[51] Int. Cl.³ .............................................. H01S 3/00
[52] U.S. Cl. ..................................... 372/33; 315/41; 372/56; 372/38
[58] Field of Search ................. 372/33, 56, 61, 81, 372/82, 38, 109, 63; 315/41, 43

[56] References Cited

U.S. PATENT DOCUMENTS

| | | | |
|---|---|---|---|
| 1,939,689 | 12/1933 | Gebhard | 250/17 |
| 1,963,131 | 6/1934 | Hallborg | 315/38 |
| 1,995,301 | 3/1935 | Gebhard | 171/242 |
| 2,935,306 | 5/1960 | Beurtheret | 257/250 |
| 3,413,568 | 11/1968 | Gordon et al. | 372/37 |
| 3,439,288 | 4/1969 | Mangin | 372/4 |
| 3,466,567 | 9/1969 | Neusel | 372/63 |
| 3,582,821 | 6/1971 | Gordon et al. | 372/63 |
| 3,699,470 | 10/1972 | Witte | 372/63 |
| 3,952,264 | 4/1976 | Ingard | 372/63 |
| 4,143,339 | 3/1979 | Buzzard et al. | 372/63 |

OTHER PUBLICATIONS

Alger et al., "Sealed Copper Vapor Laser Assembly", UCRL-85710, Rev. 1, Lawrence Livermore Laboratory, UC, Jun. 1981.

Primary Examiner—James W. Davie
Attorney, Agent, or Firm—L. E. Carnahan; Roger S. Gaither; Judson R. Hightower

[57] ABSTRACT

A gas laser having a metal inlet gas feed line assembly shaped as a coil, to function as an electrical inductance and therefore high impedance to pulses of electric current applied to electrodes at opposite ends of a discharge tube of a laser, for example. This eliminates a discharge path for the laser through the inlet gas feed line. A ferrite core extends through the coil to increase the inductance of the coil and provide better electric isolation. By elimination of any discharge breakdown through the gas supply, efficiency is increased and a significantly longer operating lifetime of the laser is provided.

19 Claims, 4 Drawing Figures in the art. In the usual form of
INDUCTIVE GAS LINE FOR PULSED LASERS

BACKGROUND OF THE INVENTION

The invention described herein arose at the Lawrence Livermore National Laboratory in the course of, or under, Contract No. W-7405-ENG-48 between the United States Department of Energy and the University of California.

This invention relates to gas lasers, more particularly to a means for eliminating discharge breakdown through the gas supply of a gas laser, and more particularly to an inductive gas line for eliminating a discharge path through the gas supply line of a pulsed laser, such as a copper vapor laser.

Gas lasers are known in the art. In the usual form of prior known gas lasers, neutral component atoms of a gas plasma active medium are excited by establishing a gas discharge in the gas. The gas discharge may be maintained by applying a radio frequency electric field, or by establishing current between a cathode and an anode, as is done in conventional gas discharge tubes. In either case, the gas discharge region is normally defined by an extended tubular or cylindrical member having an axis which is coincidental with the light beam to be generated or amplified. The desired laser action results from in-phase radiation at a specific frequency by a large number of excited neutral atoms as they decay to a lower energy state. The net gain of the laser is normally proportional to the total length of the gas plasma through which the resultant light wave propagates.

Various type of gas lasers have been developed. These prior gas laser systems are exemplified by U.S. Pat. No. 3,582,821 issued June 1, 1971 to E. I. Gordon et al; No. 3,413,568 issued June 22, 1965 to E. I. Gordon et al; No. 3,952,264 issued Apr. 20, 1976 to K. U. Ingard; No. 3,439,288 issued Apr. 15, 1969 to J. P. Mangin, No. 3,466,567 issued Sept. 9, 1969 to R. H. Neusel; No. 3,699,470 issued Oct. 17, 1972 to R. S. Witte; and No. 4,143,339 issued Mar. 6, 1979 to R. J. Buzzard et al.

With the advent of the laser isotope separation efforts, which for example uses dye lasers in the separation process, gas lasers, such as copper vapor lasers, are utilized to pump the dye lasers. The copper vapor laser, for example, comprises a discharge tube containing flowing helium or neon gas and copper which is vaporized before laser operation occurs. Such a copper vapor laser is exemplified by UCRL-85710, Rev. 1, "Sealed Copper Vapor Laser Assembly", T. W. Alger et al, June 1981, published by the University of California, Lawrence Livermore Laboratory, Livermore, Calif.

A problem associated with gas laser systems which has resulted in a serious operational constraint has been in feeding the gas into the system through the high voltage end of the discharge tube. The gas inlet tube provides an alternate discharge path which results in lowering the laser's efficency, heating the gas supply line and disintegration of the fittings, thereby terminating the operation of the laser after a relatively short time.

Prior efforts to resolve this problem were to utilize dielectric tubes and capillary tubes as the gas supply line, but this was unsuccessful because of discharge heating and vacuum pumping difficulties. Thus, a need has existed for an effective means of eliminating the discharge path of a gas laser through the inlet gas line, whereby laser efficiency and laser operating lifetime would be increased.

SUMMARY OF THE INVENTION

The present invention fills the above mentioned need and solves the problems associated with feeding the gas into the laser system through the high voltage end. This is accomplished by providing an inductive gas feed line assembly whereby the laser discharge tube becomes the path of least resistance so the discharge occurs along the tube producing laser action.

Therefore, it is an object of this invention to provide a means and method for eliminating electrical discharge through the inlet gas line of a pulsed gas laser.

A further object of the invention is to provide inductive gas line assembly for pulsed gas laser systems.

Another object of the invention is to provide a coiled tube of electrically conductive material for a gas inlet line with a ferrite core extending through the coil for providing high impedance to a pulsed electric current so the current does not flow through the gas line.

Another object of the invention is to provide an inductive gas inlet line assembly for a copper vapor laser such that the path of least electrical resistance is through the discharge tube of the laser, thereby increasing the efficiency and operating lifetime of the laser.

Other objects of the invention will become readily apparent to those skilled in the art from the following description and accompanying drawings.

The above objects of the invention are carried out by forming a inlet gas feed line assembly to a gas laser, or other apparatus utilizing a pulsed electric current to produce a gas discharge, from a coiled electrically conductive (metal) tube and placing a ferrite core so as to extend through the coil. This results in a high impedance to the pulsed electric current of the apparatus to which the inlet gas feed line is connected, such as a copper vapor laser, so the current does not flow through the inlet gas line. In addition, the inductor assembly of this invention serves as a current return for recharge of the laser capacitors.

DETAILED DESCRIPTION OF THE INVENTION

The invention is directed to an inductive gas inlet line assembly through which a gas is supplied to an apparatus utilizing a gas discharge tube, such as a pulsed gas laser, in which pulsed electric current is utilized to produce the gas discharge. The inductive gas inlet line assembly of this invention provides a high impedance to such a pulsed electric current so the current does not flow back through the gas line. The above-mentioned problem of feeding gas to a gas laser system through the high voltage end of the system is overcome by this invention. By use of this invention the inlet gas line no longer provides an alternate discharge path for a gas laser, for example, which has previously resulted in lowering the laser's efficiency, heating the gas supply line and disintegration of the fittings, whereby operation of the laser after a relatively short time was terminated. By using the inductive gas inlet line assembly of this invention, the laser discharge tube is the path of least resistance so the discharge occurs along the tube producing laser action. Also, the inductor inlet gas assembly serves as a current return for recharge of the laser capacitors.

The invention basically comprises a gas feed tube of electrically conductive material, such as metal, shaped as a coil with a core of highly magnetic permeability material, such as ferrite, extending through the coil, to function as an electrical inductance and therefore high impedance to pulses of electric current applied to electrodes at opposite ends of a gas laser discharge tube, for example. The ferrite core extends through the coil to increase the inductance of the coil and provide better electric isolation.

While the invention is described herein with respect to its use in gas laser systems, particularly a copper vapor laser system, it is not intended to limit the use of the the invention to gas lasers of any type, since the invention can find use in other types of gas discharge systems utilizing pulsed electric current, wherein the gas inlet line provides an alternate discharge path.

Figure 1:
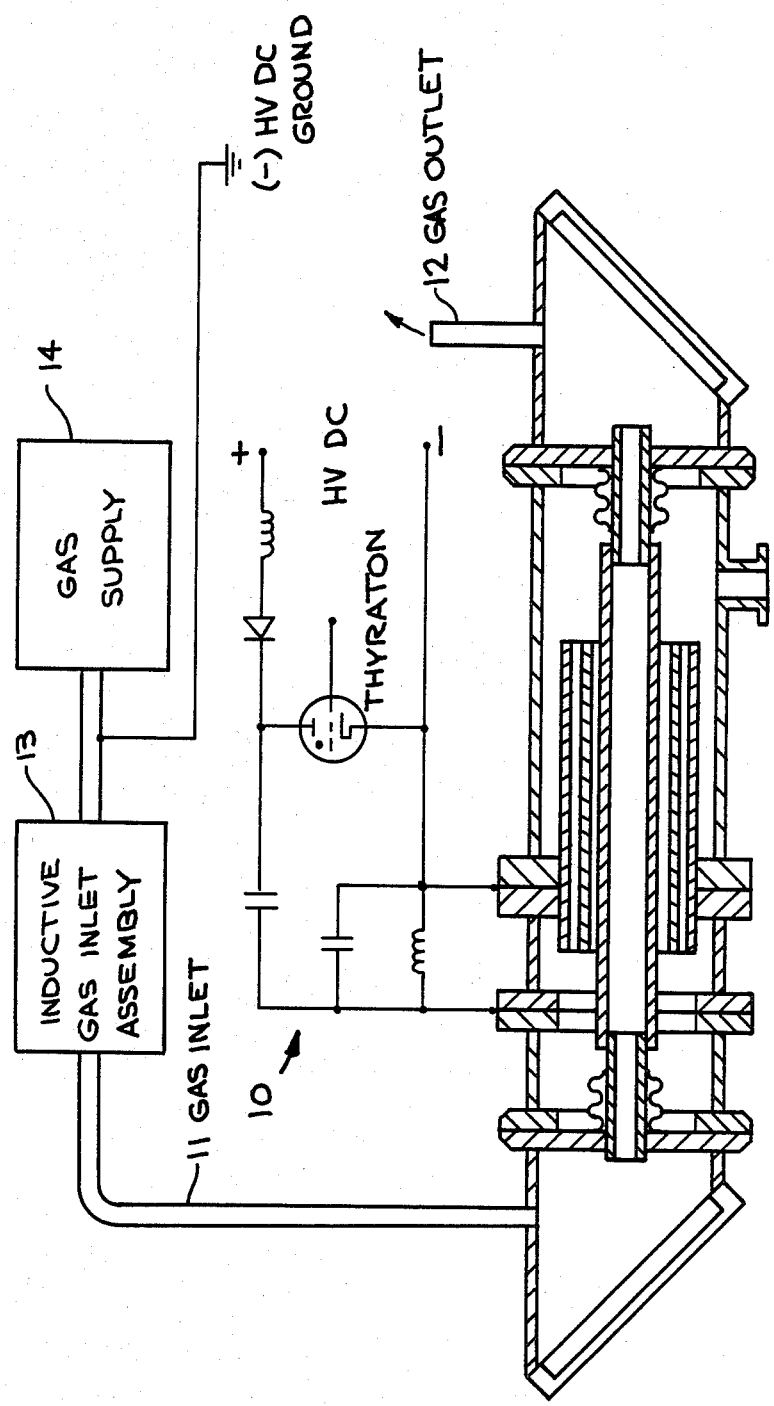
FIG. 1 illustrates a laser system connected to an inductive gas inlet line assembly of the invention.
Figure 2:
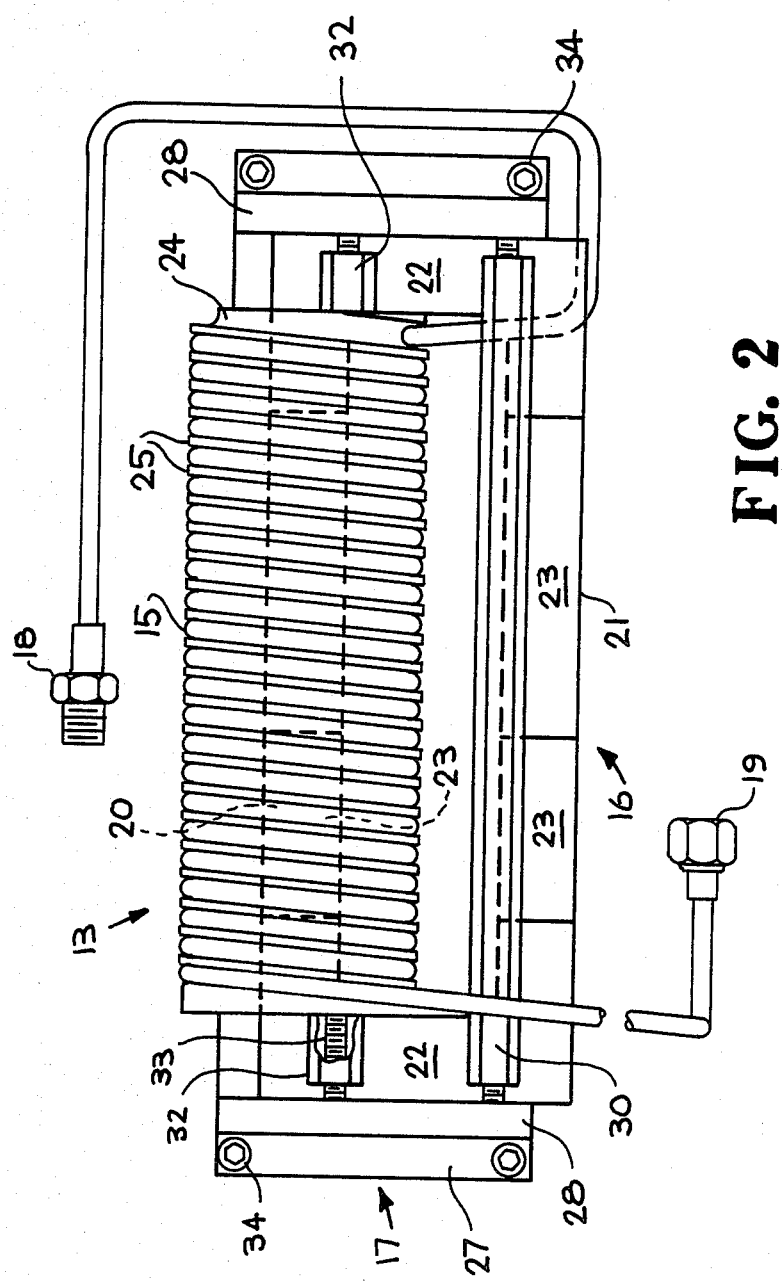
FIG. 2 is a plan view of an embodiment of the inductive gas inlet line assembly made in accordance with the invention.
Figure 3:
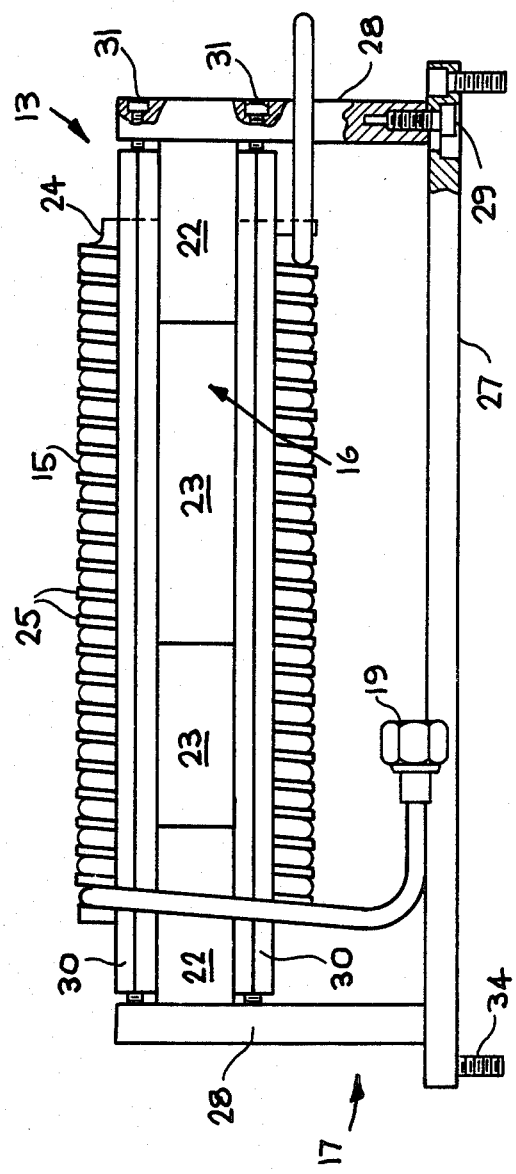
FIG. 3 is a side view of the embodiment of FIG. 2.
Figure 4:
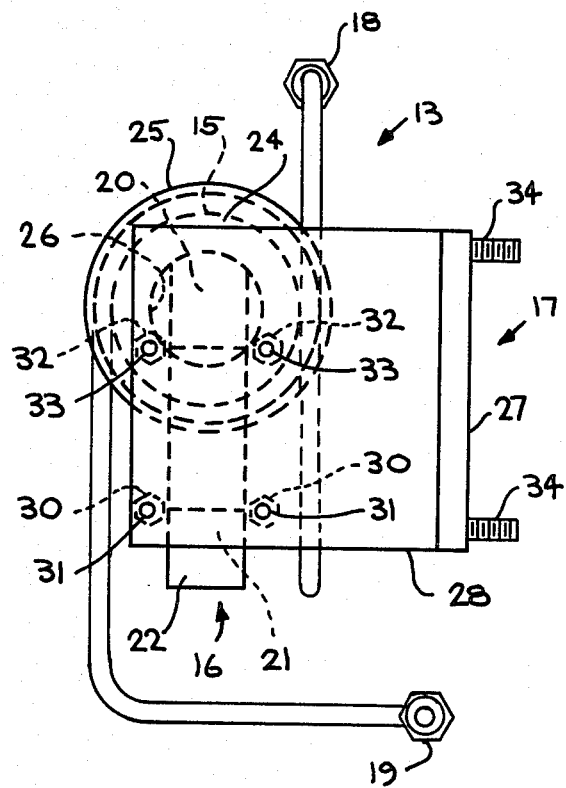
FIG. 4 is an end view of the embodiment of FIG. 2.

Referring now to the drawings, the inductive gas inlet line assembly of the present invention is diagramatically shown in FIG. 1 interconnecting a gas supply to a copper vapor laser system, the details of the inductive gas inlet line assembly being illustrated in FIGS. 2–4. As shown in FIG. 1, a copper vapor laser system, generally indicated at 10, is provided with a gas inlet 11 and a gas outlet 12. Gas inlet 11 is connected through an inductive gas inlet line assembly 13 to a gas supply 14, gas supply 14 being at electrical ground (potential). The details of the laser system 10 do not constitute part of this invention, and further details thereof may be found in above-referenced document UCRL-85710, Rev. 1. Basically in the operation of the FIG. 1 apparatus, flowing helium or neon gas for example, from supply 14 is directed through assembly 13, gas inlet 11, into a discharge tube of the laser 10 utilizing pulsed electric current for producing laser action, as known in the art, with the remaining gas passing out from laser 10 through gas outlet 12. Since the operation of laser systems of this type are well known in the art, further description thereof is deemed unnecessary. However, as pointed out above, the gas inlet tube in prior know gas laser systems using pulsed electric current to produce the desired gas discharge has provided an alternate discharge path. This alternate discharge path is eliminated by the inductive gas inlet line assembly 13.

Referring now to FIGS. 2–4, an embodiment of the inductive gas inlet line assembly 13 is illustrated. Basically, the assembly 13 comprises a feed or inlet tube constructed of electrically conductive material, such as metal, shaped in a coil 15, with a core of magnetic material, generally indicated at 16, extending through the coil and supported in a framework, generally indicated at 17. Core 16 is made of any high magnetic permeability material, such as ferrite. Coil 15 is provided at each end with couplings 18 and 19, coupling 18 being adapted to be connected to gas inlet 11 of laser 10 while coupling 19 is connected to gas supply 14.

The core 16, as shown, is of a rectangular configuration and composed of a pair of spaced leg sections 20 and 21 interconnected by end sections 22. Core 16 is comprised of a plurality of body segments 23 and end sections 22, but may consist of a single ferrite rectangular, squared or donut-shaped element. Core 16 may also be of a squared or a double U-shaped configuration, so as to consist of a pair of legs, one extending through coil 15.

Coil 15 is constructed of any tubing of electrically conductive material such as a metal exemplified by copper, aluminum and stainless-steel. Coil 15 is wrapped around a mandrel 24, of non-conductive or non-magnetic material such as plastic, having a plurality of radially extending members or fins 25 to maintain spacing between the wraps of the coil. An annular opening 26 (see FIG. 4) extends through mandrel 24, through which leg 20 of core 16 extends.

Framework 17 comprises a base plate or member 24, a pair of side plates or members 28 secured to base plate 27 as by bolts 29, only one shown, a first pair of hexagonal standoff or spacer tubes or members 30 positioned adjacent leg 21 of core 16 and secured intermediate side plates 28 as by bolts 31. Two pairs of hexagonal standoff or spacer tubes or members 32, having threaded rods 33 extending therethrough and through mandrel 24, and are positioned adjacent each end of leg 20 of core 16, with rods 33 being secured to side plates 28. The positioning of the standoffs 30 and 32 with respect to the core 16 can be best seen from FIG. 4, with one of the threaded rods 33 shown in FIG. 2. Base plate 27 may be secured to a work station via bolts 34 (four shown in this embodiment). The various components of framework 17 are preferably constructed of non-magnetic, or non-conductive materials, so as not to adversely affect the inductance or impedance of the coil-core arrangement.

With the inductive gas inlet line assembly 13 connected to laser 10, for example, the metal gas feed coil 15 functions as an electrical inductance and therefore high impedance to pulses of electrical current applied to electrodes of the laser discharge tube. The ferrite core 16 is located in the coil 15 to increase the inductance of the coil and provide better (greater) electric isolation. With this arrangement, the discharge tube of laser 10 is the path of least resistance so the discharge occurs along the tube producing laser action. Also, the inductor serves as a current return for recharge of the laser capacitors.

It has thus been shown that the present invention eliminates the discharge breakdown problem through the gas supply tube. The invention also eliminates the problems associated with the use of dielectric tubes and capillary tubes for supplying the gas to the laser. The result produced by the invention is an increased operating lifetime for the laser.

While a particular embodiment of the invention has been illustrated and described, modifications and changes will become apparent to those skilled in the art, and it is intended to cover in the appended claims all such modifications and changes as come within the scope of the invention.

What is claimed is:

1. A method for eliminating an electrical discharge path through a gas inlet line connected to a gas discharge chamber utilizing pulsed electrical energy for producing the gas discharge, comprising the steps of:
   utilizing a gas inlet line constructed of electrically conductive material,
   forming the gas inlet line in a coil configuration, and thereby providing an impedance with the coil to any pulsed electric current entering the gas inlet line.

2. The method of claim 1, additionally including the step of placing a core of high magnetic permeability material in the coil to increase inductance of the coil and to provide greater electric isolation.

3. The method of claim 2, additionally including the steps of positioning the coil on a mandrel, and supporting the coil and core in a framework.

4. The method of claim 2, additionally including the steps of forming the gas inlet line from a metal tube, and forming the core of ferrite material.

5. An inductive gas inlet line assembly adapted for connection to an associated gas discharge device such as a gas laser for eliminating an electrical discharge path through the gas inlet line, said assembly comprising:
an electrically conductive gas inlet line formed in the shape of a coil and adapted to be connected between an associated gas supply and an associated gas discharge device,
whereby the coil provides impedance to any electrical discharge through the gas inlet line.

6. The inductive gas inlet line assembly of claim 5, additionally including a core of magnetic permeability material positioned in said coil for increasing the inductance of the coil and providing greater electric isolation.

7. The inductive gas inlet line assembly of claim 6, wherein said gas inlet line is constructed of metal selected from the group consisting of copper, stainless-steel and aluminum, and the core is constructed of ferrite.

8. The inductive gas inlet line assembly of claim 5, additionally including a mandrel about which said coil is wrapped.

9. The inductive gas inlet line assembly of claim 8, wherein said core is of a rectangular configuration with spaced leg sections, one of said leg sections extending through said coil and said mandrel.

10. The inductive gas inlet line assembly of claim 8, wherein said core consists of a pair of end sections and a plurality of body segments forming a pair of spaced leg sections.

11. The inductive gas inlet line assembly of claim 10, additionally including a supporting framework for said coil and said core.

12. The inductive gas inlet line assembly of claim 11, wherein said supporting framework comprises a base plate, a pair of side plates secured to said base plate, and a plurality of members extending between said side plates for supporting said coil, said mandrel, and said core therebetween.

13. The inductive gas inlet line assembly of claim 6, additionally including a framework for supporting said coil and said core.

14. In a copper vapor laser having a gas discharge tube, a pair of electrodes positioned in spaced relation for producing a pulsed electric current through the discharge tube, and gas inlet means for flowing gas into the discharge tube, the improvement comprising:
means for preventing a discharge path for the electric current through the gas inlet means, said means preventing including:
a coil constructed of electrically conductive material placed in the gas inlet means to provide an inductive impedance to pulsed electric current applied at the electrodes.

15. The improvement of claim 13, additionally includes a core of high magnetic permeability material extending through said coil for increasing the inductance of the coil.

16. The improvement of claim 15, additionally including a mandrel of non-conductive material about which said coil is wrapped.

17. The improvement of claim 16, wherein said core is of a configuration having a pair of spaced leg sections and interconnecting end sections, one of said leg sections extending through said mantrel and said coil.

18. The improvement of claim 17, additionally including a framework for supporting said mantrel, said coil, and said core.

19. The improvement of claim 14, wherein said coil is constructed of metal, and said core is of ferrite.

* * * * *